US006157865A

United States Patent [19]

Cromett

[11] Patent Number: 6,157,865

[45] Date of Patent: Dec. 5, 2000

[54] USER-CREATED CURIOS MADE FROM HEAT-SHRINKABLE MATERIAL

[75] Inventor: John Cromett, Portland, Oreg.

[73] Assignee: Mattel, Inc., El Segundo, Calif.

[21] Appl. No.: 08/874,745

[22] Filed: Jun. 13, 1997

[51] Int. Cl.[7] .......... G06F 19/00

[52] U.S. Cl. .......... 700/95; 700/96; 700/97; 700/118; 63/20; 63/23

[58] Field of Search .......... 29/412, 415, 805; 428/7, 13, 46, 195, 57; 400/662, 659, 661.1; 63/20, 23

[56] References Cited

U.S. PATENT DOCUMENTS

| | | | |
|---|---|---|---|
| 3,526,103 | 9/1970 | Lieber | 63/2 |
| 3,785,912 | 1/1974 | Van Deusen | 161/6 |
| 3,889,270 | 6/1975 | Hoffman et al. | 346/1 |
| 3,949,117 | 4/1976 | Jvirblis et al. | 227/22 |
| 4,102,456 | 7/1978 | Morris | 206/575 |
| 4,109,851 | 8/1978 | Goates | 229/92.8 |
| 4,503,111 | 3/1985 | Jaeger et al. | 428/195 |
| 4,521,104 | 6/1985 | Craig | 335/20 |
| 4,555,437 | 11/1985 | Tanck | 428/212 |
| 4,557,312 | 12/1985 | Gonzales | 164/34 |
| 4,578,285 | 3/1986 | Viola | 427/209 |
| 4,635,132 | 1/1987 | Nakamura | 358/296 |
| 4,687,526 | 8/1987 | Wilfert | 156/64 |
| 4,725,511 | 2/1988 | Reber | 428/620 |
| 4,877,688 | 10/1989 | Senoo et al. | 428/522 |
| 4,923,848 | 5/1990 | Akada et al. | 503/227 |
| 4,936,699 | 6/1990 | Yoshida | 401/88 |
| 4,996,087 | 2/1991 | Rebstock | 428/11 |
| 5,009,626 | 4/1991 | Katz | 446/391 |
| 5,116,174 | 5/1992 | Fried et al. | 409/79 |
| 5,148,196 | 9/1992 | Spector | 354/75 |
| 5,190,805 | 3/1993 | Atherton et al. | 428/195 |
| 5,206,071 | 4/1993 | Atherton et al. | 428/195 |
| 5,252,533 | 10/1993 | Yasuda et al. | 503/227 |
| 5,343,386 | 8/1994 | Barber | 364/400 |
| 5,382,233 | 1/1995 | Brotz | 604/88 |
| 5,404,731 | 4/1995 | Traub | 63/32 |
| 5,515,592 | 5/1996 | Mills | 29/412 |
| 5,518,433 | 5/1996 | Sneddon | 446/14 |
| 5,644,988 | 7/1997 | Xu et al. | 101/488 |
| 5,683,763 | 11/1997 | Shillan et al. | 428/13 |
| 5,728,440 | 3/1998 | Good | 428/40.1 |
| 5,753,344 | 5/1998 | Jacobsen | 428/142 |
| 5,795,088 | 8/1998 | Wen et al. | 400/662 |

FOREIGN PATENT DOCUMENTS

| | | |
|---|---|---|
| 0 235 398 A1 | 3/1986 | European Pat. Off. . |
| 0 326 515 A1 | 2/1989 | European Pat. Off. . |
| 51124151 | 10/1976 | Japan . |
| 51125544 | 11/1976 | Japan . |
| 53-071175 | 6/1978 | Japan . |
| 53-113553 | 10/1978 | Japan . |
| 64041312 | 3/1989 | Japan . |

*Primary Examiner*—Paul P. Gordon
*Assistant Examiner*—Ramesh Patel
*Attorney, Agent, or Firm*—Kolisch Hartwell Dickinson McCormack & Heuser

[57] ABSTRACT

A process and system to fabricate jewelry or curios. A conventional drawing program is used to create, manipulate or input an image. The image is reversed or flipped to make a mirror view of the image. This mirror view of the desired image is then printed on heat shrinkable material base material which has been specially coated. The sheet of base material with the mirror image is then shrunk utilizing heat. A this point the image can be viewed by looking through the non printed side of base material. Viewing the image through the base material (which is possible because the image is reversed) has been found to create a much sharper image. The printed side of the resulting curio is coated with a transparent material in order to add water fastness and durability. Finally the printed side of the curio is coated with an opaque white coating. It has been found that applying this opaque coating dramatically increases the quality of the image when the curio is placed on a dark background material.

18 Claims, 2 Drawing Sheets

USER-CREATED CURIOS MADE FROM HEAT-SHRINKABLE MATERIAL

FIELD OF THE INVENTION

The present invention combines sophisticated computer technology and simple craft processes for designing jewelry and other curios. The result is an educational and entertaining technique which allows children and adults to be creative. The present invention is also a useful mechanism to introduce children and adults to the uses; and application of computer technology.

BACKGROUND OF THE INVENTION

Craft processes for making jewelry and curios are well known. One of the known techniques utilizes heat shrinkable material. An individual can draw a picture on the heat shrinkable material and then shrink the material to make an item of jewelry or a curio.

Color printers for attachment to computers and programs for creating color images are well known and widely available.

The introduction of a computer technology into the jewelry or curio making process provides a learning tool and allows a user to be much more creative; however, the prior art process must be altered in order to accommodate the computer technology.

SUMMARY OF THE INVENTION

The present invention provides a process and system which allows an individual to fabricate highly creative jewelry or curios. The invention utilizes a conventional computer program which provides a means for an individual to create, manipulate or input an image. Such an image can easily include "clip art" from a "trunk" of existing images or digitally captured photo images. The images created by a user with a normal drawing program are typically directly printed utilizing a conventional color printer. However, with the present invention after the image is inputted, created, or manipulated the drawing program is used to reverse or flip the image, that is, to make a mirror view of the image. This mirror view of the desired image is then printed on heat shrinkable base material which has been coated to promote adhesion and reduce smearing. The sheet of base material with the mirror image is then shrunk utilizing heat. At this point the image can be viewed by looking through the non printed side of the base material.

Viewing the image through the base material (which is possible because the image was reversed) has been found to create a much sharper image. The printed side of the resulting curio is coated with a transparent protective material in order to add water fastness and durability. Finally the printed side of the curio is coated with an opaque white coating. It has been found that applying this opaque coating dramatically increases the quality of the image when the curio is placed on a dark background material.

BRIEF DESCRIPTION OF THE IMAGES

DESCRIPTION OF A PREFERRED EMBODIMENT

Figure 1:
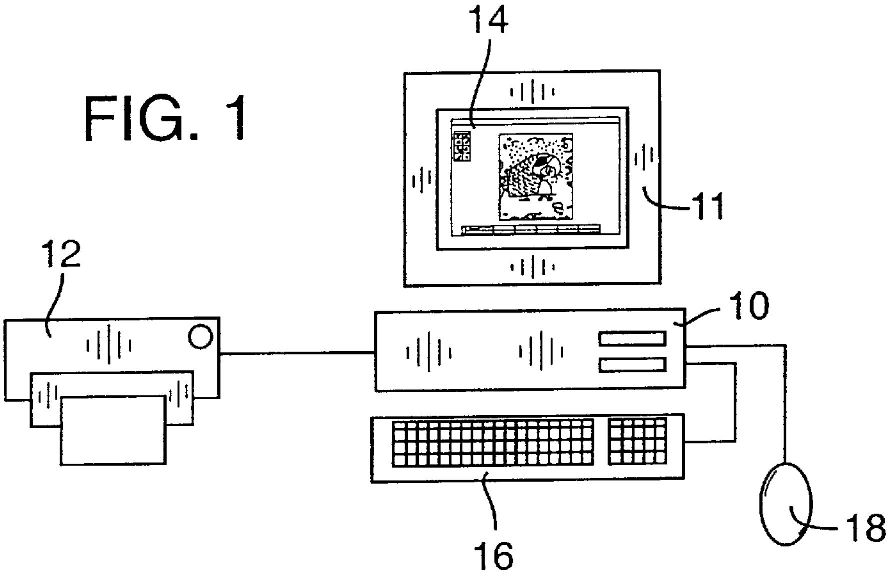
FIG. 1 shows the system used with the present invention.

The overall system used with the present invention is shown in FIG. 1. The system includes a computer 10 which has a display 11, a color printer 12, a keyboard 16 and a mouse 18. The computer 10 is an IBM compatible computer which is operating under the Microsoft Windows operating system. The computer includes a drawing program 14 which can for example be the program marketed by Broderbund Corp. under the trademark Print Shop or the program marketed by Corel Corp. under the trademark Corel Draw. The drawing program 14 is stored in computer 10 and it creates images on display 11. The printer 12 is a model number 694 color ink jet printer marketed by Hewlett Packard Corp.

Figure 2:
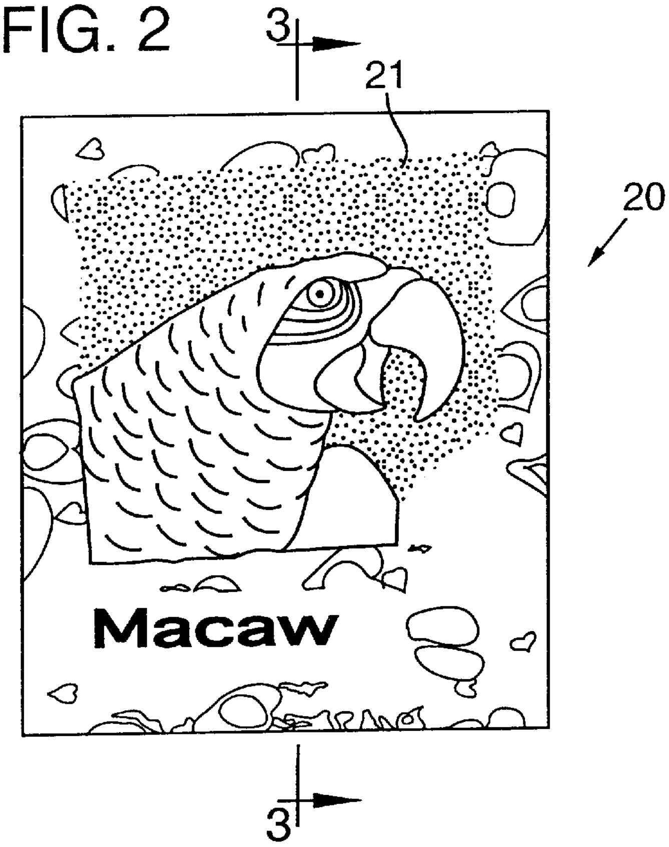
FIG. 2 is a plan view of a curio made with the present invention.
Figure 3:
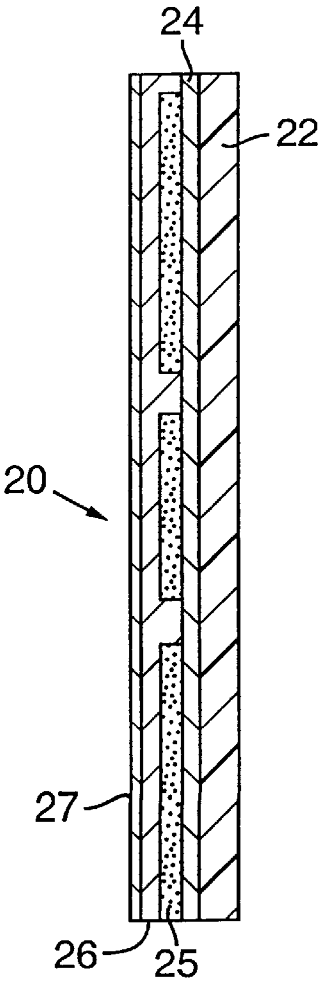
FIG. 3 is a side view of a curio made with the present invention.

FIGS. 2 and 3 show one of the curios make by the present process. The particular curio shown includes a picture of a bird 21. FIG. 2 is a plan view showing the image 21 and FIG. 3 is a side view showing the layers in the curio. The image would normally be colored, however, since FIG. 2 is in black and white, the colors are indicated in FIG. 2 by shading. The actual image and the actual colors are not relevant to the present invention and curios made with the present invention can include any image made, imported or modified by the user. The actual image can be any image which can be handled by drawing program 14 and printed by printer 12.

As shown in FIG. 3, the layers in the curio include polystyrene the base material 22, colored ink 25 which forms the image 21, a layer 24 which promotes adhesion between the ink 25 and the base material 22, a coating of clear varnish 26 which preserves the curio and a layer of white acrylic paint 27 which enhances the visibility of the image when viewed through base layer 22.

Figure 4:
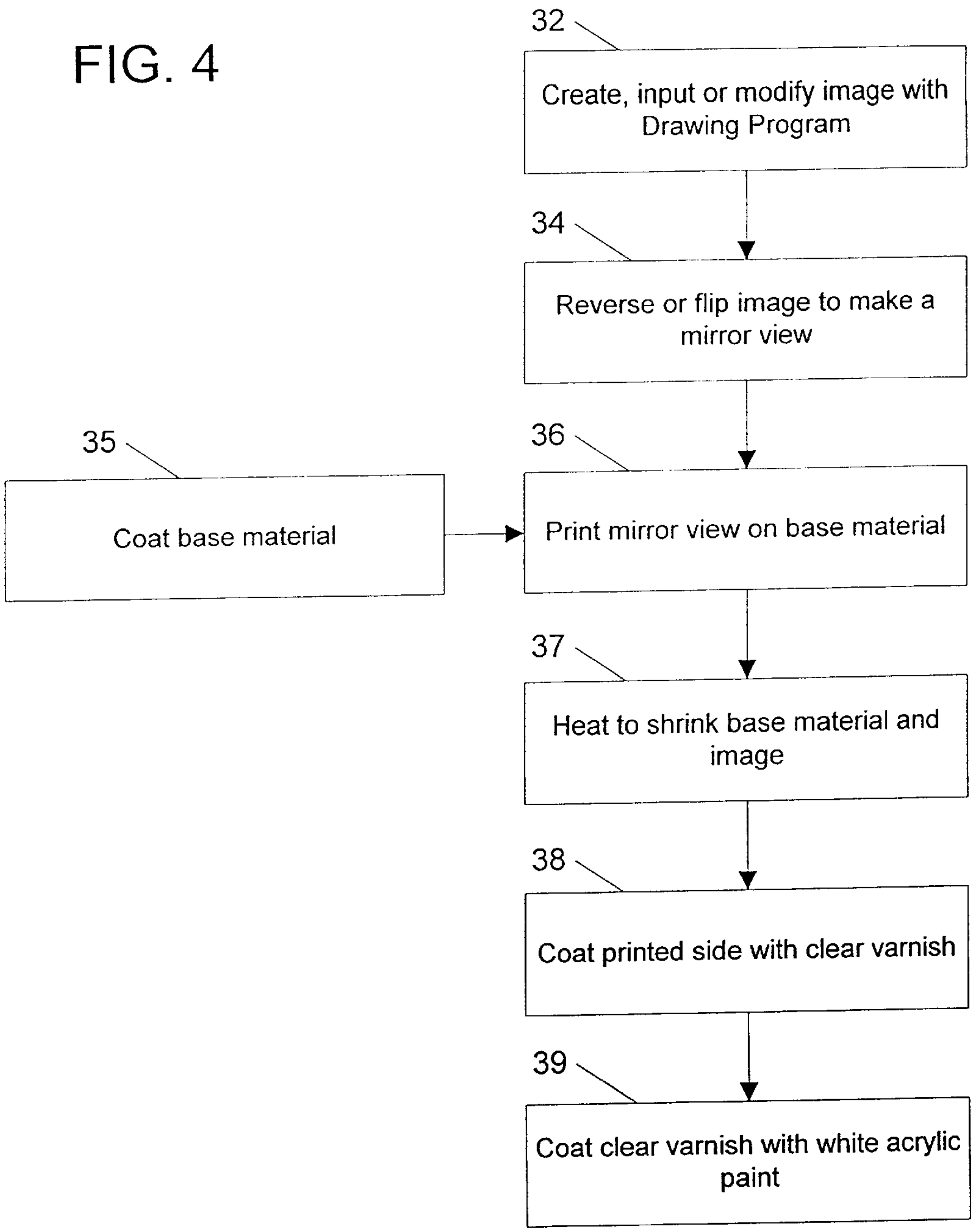
FIG. 4 is a flow diagram of the steps used in the present invention.

The process steps for making the curio are shown in FIG. 4. First, as indicated by block 32, the user inputs or creates an image using the drawing program 14. The image can be a scanned photograph, a piece of clip art, a newly created image, a combination of the foregoing or anything that can be handled by drawing program 14.

Once the user is satisfied that he has the desired image, the image is flipped as indicated by block 34 to create a mirror view of the image. Drawing programs have the ability to flip an image or this can be done with a special purpose program which takes an image and creates a mirror view thereof. A program for creating a mirror image is well within the present day state of the art in programming.

As indicated by block 35, in order to have an appropriate printing surface for an ink jet printer, the polystyrene base material 22 must be coated with a water-insoluble, water-absorptive and ink-receptive material. There is a considerable amount of literature which describes such material. For example, see U.S. Pat. Nos. 5,206,071, 4,503,111, 3,889,270, 4,555,437, 4,578,285 and 5,190,805. The exact chemical composition of the coating used is not relevant to the present invention. This coating process is done off line in large batches and the coated polystyrene is treated as normal printing paper for the printer.

As indicated by block 36, the mirror image is printed on the base material 22 and the base material with the image thereon is heated to shrink the base material and the image (see block 37).

As indicated by block 38, the printed side of the base material is next coated with clear varnish. A water based varnish such as the varnish marketed by Palmer Paint Products of Troy Michigan under the tradename PRISM can be used.

As indicated by block 39, the final step of the process is to coat the printed and varnished side of the base material with an opaque, white paint. The Acrylic paint marketed by Palmer Paint Products under the trade name PRISM can be used for this purpose. It is noted that step 39 is not absolutely necessary in order to make a worthwhile curio. However, it has been found that this step results in a dramatic improvement in the appearance of the image, especially when the image is viewed in front of a dark background.

Curios made in accordance with the above process can be mounted on rings, or pins. Prior to the heat shrink step the base material with the image thereon can be cut into any desired shape. Prior to the heat shrink step, holes can be easily drilled or punched in the curios so that the resulting curios can be mounted on a string or chain. The term curio as used herein is meant to encompass various types of objects and jewelry.

While a preferred embodiment of the invention has been shown and described herein, it should be understood that various changes in form and detail can be made without departing from the spirit and scope of the present invention. The foregoing, description of the preferred embodiment of the invention is not intended to be exhaustive or to limit the invention to the precise form disclosed, and many modifications and variations are possible in light of the above teaching. The embodiment was chosen and described in order to explain best the principles of the invention and its practical application thereby to enable others skilled in the art best to utilize the invention in various embodiments and with various modifications as are suited to the particular use contemplated. The scope of the present invention is only limited by the claims.

I claim:

1. A process for making a curio having the steps of:

forming an image using a computerized drawing program, generating a mirror view of said image, printing said mirror view on a heat-shrinkable base material which has been coated to make said printed mirror view adhere to said base material, heating said base material to shrink said base material and said printed mirror view, coating said shrunk printed mirror view with a layer of transparent varnish adapted to preserve said base material and said shrunk printed mirror view, and coating said layer of transparent varnish with an opaque white paint to improve the appearance of said shrunk printed mirror view, wherein said shrunk printed mirror view can be viewed through said heat-shrinkable base material against the contrast of said opaque white paint.

2. The process recited in claim 1 wherein said base material is polystyrene.

3. The process recited in claim 1 wherein said printing is by means of an ink jet printer.

4. A curio which includes an image, said curio comprising:

a mirror view of said image mounted on a transparent heat-shrink base material whereby said image can be viewed through said heat-shrink base material, a transparent varnish coating covering said mirror view of said image, and adapted to provide water fastness and durability to said curio, and an opaque protective coating covering said transparent varnish coating, where said opaque protective coating is adapted to improve the viewing contrast of said mirror view of said image.

5. The curio recited in claim 4 wherein said opaque protective coating includes a layer of opaque white paint.

6. The curio recited in claim 4 wherein said base material is polystyrene.

7. A process for making a curio having the steps of:

forming a image using a drawing program, printing a mirror view related to said image on a heat-shrinkable base material which has been coated to make said mirror view adhere to said base material, heating said base material to shrink said base material and said mirror view, and coating said shrunk mirror view with a protective coat, where said protective coat includes a transparent varnish covering said shrunk mirror view to preserve said base material and said shrunk mirror view, and an opaque paint covering said transparent varnish layer to improve the viewing contrast of said shrunk mirror view.

8. The process recited in claim 7 wherein said opaque paint is white.

9. The process recited in claim 7 wherein said base material is polystyrene.

10. A user-created curio, comprising:

a translucent heat-shrinkable base material, an ink applied to the base material to form an image, a transparent coating applied to cover and preserve the curio, and an opaque coating applied to the transparent coating to cover at least a portion of the image, where the transparent coating is between the ink and the opaque coating, wherein the image can be viewed through said heat-shrinkable base material against the contrast of the opaque coating.

11. The curio of claim 10, wherein the opaque coating covers the image in its entirety.

12. The curio of claim 10, wherein the opaque coating is a white acrylic paint.

13. The curio of claim 10, wherein the ink is color ink-jet ink.

14. A method of creating a curio, comprising the steps of:

applying an ink to a translucent heat-shrinkable base material to create a user-defined image, heating the base material to shrink the base material, coating at least a portion of the ink on the base material with a transparent varnish adapted to preserve the curio by increasing durability of the base material, and covering at least a portion of the ink on the base material with an opaque coating, wherein the image can be viewed through said heat-shrinkable base material.

15. The method of creating a curio according to claim 14, wherein the step of covering includes covering the image in its entirety.

16. The method of creating a curio according to claim 14, wherein the opaque coating includes acrylic.

17. The method of creating a curio according to claim 14, wherein the base material includes polystyrene.

18. The method of creating a curio according to claim 14, wherein the step of applying includes use of a computer printer to print the image directly on the heat-shrinkable base material.

* * * * *